(12) United States Patent
Schulte et al.

(10) Patent No.: US 8,656,666 B2
(45) Date of Patent: Feb. 25, 2014

(54) TOOL HOLDER AND PLATE ASSEMBLY AND METHOD FOR PRODUCING TOOL HOLDER AND PLATE ASSEMBLY

(75) Inventors: Martin Schulte, Balve (DE); Benedikt Specht, Sundern (DE)

(73) Assignee: Dura Automotive Body & Glass Systems GmbH, Plettenberg (DE)

( * ) Notice: Subject to any disclaimer, the term of this patent is extended or adjusted under 35 U.S.C. 154(b) by 0 days.

(21) Appl. No.: 12/955,245

(22) Filed: Nov. 29, 2010

(65) Prior Publication Data

US 2011/0138716 A1 Jun. 16, 2011

(30) Foreign Application Priority Data

Nov. 27, 2009 (EP) ..................................... 09177319

(51) Int. Cl.
 *E06B 3/00* (2006.01)
 *E06B 1/68* (2006.01)
 *B60J 10/02* (2006.01)

(52) U.S. Cl.
 CPC ... *E06B 1/68* (2013.01); *B60J 10/02* (2013.01)
 USPC ........ 52/208; 52/716.7; 52/716.8; 52/718.01; 52/204.591

(58) Field of Classification Search
 CPC .... B60J 10/0051; B60J 10/02; B60J 10/0062; E06B 1/32; E06B 1/34; E06B 1/56; E06B 1/60; E06B 1/62; E06B 1/68; E06B 3/5892
 USPC ............... 52/208, 716.1, 716.4, 716.5, 716.7, 52/716.8, 718.01, 718.06, 717.03, 717.06, 52/717.05, 717.04, 204.71, 204.591, 52/204.597; 269/93, 201
 See application file for complete search history.

(56) References Cited

U.S. PATENT DOCUMENTS

| | | | | |
|---|---|---|---|---|
| 1,804,831 A | * | 5/1931 | Hardesty | ...................... 52/716.7 |
| 2,000,466 A | * | 5/1935 | Howard | .......................... 428/99 |
| 2,169,503 A | * | 8/1939 | Schlegel | ...................... 49/489.1 |

(Continued)

FOREIGN PATENT DOCUMENTS

FR 2577483 A1 * 8/1986 ................. B60J 1/10

OTHER PUBLICATIONS

1986, Machine Translation of FR 2577483 A1.*

(Continued)

*Primary Examiner* — Brent W Herring
(74) *Attorney, Agent, or Firm* — Stetina Brunda Garred & Brucker

(57) ABSTRACT

The invention relates to a clamping holder as well as to a pane assembly comprising such a clamping holder and to a method for producing such a pane assembly. Pane assemblies, which are injection molded on the edge side by a frame section, are known in the state of the art. In response to the production of the pane assembly, a retaining strip, which is embedded into the frame section through this after the injection molding process, is furthermore inserted into the injection molding tool. A retaining clamp, by means of which trim can be attached to the pane assembly in a clamping manner, must be attached to the retaining strip after the completion of the pane assembly. To avoid the requirement of subsequently attaching a retaining clamp, provision is made for a clamping holder comprising a connecting section and a clamp section, which is embodied such that connecting section and clamp section can together be inserted into an injection molding tool.

5 Claims, 3 Drawing Sheets

(56) References Cited

U.S. PATENT DOCUMENTS

| | | | | |
|---|---|---|---|---|
| 2,487,571 | A * | 11/1949 | Maxwell | 16/5 |
| 2,612,972 | A * | 10/1952 | Heimgartner et al. | 52/204.597 |
| 2,655,239 | A * | 10/1953 | Kenlock | 52/204.597 |
| 2,681,716 | A * | 6/1954 | Black | 52/718.05 |
| 2,719,343 | A * | 10/1955 | Harris | 49/492.1 |
| 2,948,938 | A * | 8/1960 | Holton | 24/289 |
| 3,020,606 | A * | 2/1962 | Ziffer | 49/492.1 |
| 3,155,422 | A * | 11/1964 | Leslie et al. | 296/93 |
| 3,167,824 | A * | 2/1965 | Berwanger | 49/482.1 |
| 3,189,143 | A * | 6/1965 | Adams | 52/208 |
| 3,200,448 | A * | 8/1965 | Bright | 49/490.1 |
| 3,680,903 | A * | 8/1972 | Hulten | 293/142 |
| 3,703,747 | A * | 11/1972 | Hamman | 24/289 |
| 3,908,312 | A * | 9/1975 | Pennec | 49/493.1 |
| 3,916,055 | A * | 10/1975 | Wagner | 428/161 |
| 3,968,613 | A * | 7/1976 | Meyer | 52/204.597 |
| 4,011,635 | A * | 3/1977 | Meyer | 24/293 |
| 4,161,853 | A * | 7/1979 | Weiss et al. | 52/288.1 |
| 4,436,337 | A * | 3/1984 | Bowes et al. | 296/201 |
| 4,904,014 | A * | 2/1990 | Azarovitz et al. | 296/146.15 |
| 5,021,279 | A * | 6/1991 | Whitener | 428/100 |
| 5,070,590 | A * | 12/1991 | Fujioka et al. | 29/527.2 |
| 5,096,753 | A * | 3/1992 | McCue et al. | 428/31 |
| 6,093,470 | A * | 7/2000 | Petri | 428/122 |
| 6,546,683 | B1 * | 4/2003 | Senge | 52/208 |
| 6,715,821 | B2 * | 4/2004 | Kanie et al. | 296/146.15 |
| 7,401,387 | B2 * | 7/2008 | Rosemann | 24/289 |
| 7,661,237 | B2 * | 2/2010 | Jakob-Bamberg et al. | 52/506.08 |
| 7,770,352 | B2 * | 8/2010 | Plasek et al. | 52/717.01 |
| 8,122,665 | B2 * | 2/2012 | Stanchfield et al. | 52/468 |
| 2003/0075949 | A1 | 4/2003 | Kanie et al. | |
| 2008/0034700 | A1 * | 2/2008 | Stanchfield et al. | 52/582.1 |
| 2008/0263992 | A1 * | 10/2008 | Plasek et al. | 52/716.8 |
| 2013/0186018 | A1 * | 7/2013 | Grandgirard et al. | 52/204.72 |

OTHER PUBLICATIONS

Senge, Christoph; "Verfahrens—Und Fertigungstechnik Zur Glasumspritzung in TPE Process—and Production Technology for TPE Glass Encapsulation"; Jan. 1, 2002 (19 pages).

* cited by examiner

TOOL HOLDER AND PLATE ASSEMBLY AND METHOD FOR PRODUCING TOOL HOLDER AND PLATE ASSEMBLY

CROSS REFERENCE TO RELATED APPLICATIONS

The present application claims priority to European Patent Application No. EP 09 17 7319.2 filed on Nov. 27, 2009.

STATEMENT RE: FEDERALLY SPONSORED RESEARCH/DEVELOPMENT

Not Applicable.

BACKGROUND

1. Technical Field of the Invention

The invention relates to a clamping holder, which is intended to be an integral component of a pane assembly closing openings of a vehicle body, and which is equipped to hold attachment parts on the finally assembled pane assembly in a clamping manner, encompassing at least one clamp section, to which the attachment part can be attached in the case of the finally assembled pane assembly, as well as a connecting section, which is intended to be connected to a frame section of the pane assembly so as not to be capable of being detached. The invention further relates to a pane assembly comprising a clamping holder of the above-mentioned type as well as to a method for producing such a pane assembly.

2. Description of Related Art

Clamping holders of this type are known from DE 198 18 153 B4. This document describes and claims a pane unit, which encompasses a holding device, to which further attachment parts, for example trim, can be attached to the vehicle body after the final assembly of the pane unit. The holding device consists of a retaining strip and a retaining clamp, which can subsequently be attached to the retaining strip. The retaining strip is embodied as an insert body, which is connected to the frame so as not to be capable of being detached in response to the injection molding process, in response to which the pane is injection molded with a frame, which is embodied as an injection molded part.

BRIEF SUMMARY OF THE INVENTION

A disadvantage of the known embodiment of a clamping holder is that an additional step is required for equipping the retaining strip with the retaining clamp. The pane unit can be completed only after injection molding with the frame by attaching the retaining clamp to the retaining strip. In response to improper assembly, this additional step can lead to damage to the retaining strip or other parts of the pane unit. This is not only accompanied by a logistically increased effort but also by additional quality assurance measures. In addition, a further component must be handled for the production of the pane unit and the virtually completed pane unit must be brought to a further production section. Due to the fact that the retaining clamp must be attached to the retaining strip by hand, a largely automated production of the pane unit must be interrupted, at least for this step. As is shown in DE 198 18 153 B4, retaining strip and retaining clamp must be adjusted to one another by means of relatively extensive measures with regard to construction, so that an undesired detaching of both components from one another can be safely avoided during vehicle operation in the case of the multi-part embodiment described therein.

It is therefore in particular the object of the invention to simplify the production of a pane assembly, to achieve a higher level of quality assurance and reduce the number of parts, which must be handled in response to the production.

To solve this object, the clamping holder is embodied such that connecting section and clamp section can be inserted together into an injection molding tool for completing the pane assembly.

This provides for a clamping holder, in the case of which the step of attaching the retaining clamp for completing a pane assembly after the injection molding of the pane with the frame section is eliminated. With the exception of the attachment part, which is preferably assembled only subsequently, the pane assembly is already completed in the injection molding tool.

One possibility for embodying the clamping holder such that it can be inserted completely into an injection molding tool—that is, connecting section and clamp section at the same time—lies in that the connecting section exceeds a clear projection of the clamp section on the connecting section, while embodying a circumferential sealing region towards the outside.

Clamp section and connecting section can be embodied in different ways. In a preferred embodiment, the clamp section is a metal clamp and the connecting section is embodied as plate-shaped plastic part. The clamp section can thereby be formed by a clamp part, which is held on a connecting part, which embodies the connecting section, in a clamping manner Clamp part and connecting part are thereby two components, which are originally separated from one another. Provision can also be made for the clamp section to be formed by a clamp part, which is injection molded by a connecting part, which embodies the connecting section.

In another embodiment variation, the connecting section and the clamp section are embodied from a single piece of material. In particular, provision can be made for the clamping holder to be a sheet metal made from a single piece of material, on which the clamp section and the connecting section are embodied integrally.

To ensure good adhesion between connecting section and the frame section of the pane assembly, the connecting section can be provided with an adhesion promoter.

A pane assembly comprising a window pane, a frame section provided on the window pane on the edge side and a clamping holder for attaching attachment parts to the finally assembled pane assembly, which encompasses a clamping holder according to the above-described type as holder, is also considered to be part of the invention and to be claimed.

A method for producing a pane assembly comprising at least one window pane, a frame part provided on the window pane on the edge side and a holder for subsequently attaching further attachment parts to the finally assembled pane assembly, which comprises the insertion of a clamping holder according to the afore-described type and of a window pane into an injection molding tool as well as injection molding of the clamping holder and of the window pane with the frame part for completing the pane assembly, is also considered as belonging to the invention.

BRIEF DESCRIPTION OF THE DRAWINGS

Further features and advantages of the invention result from the subclaims and from the following description of preferred exemplary embodiments by means of the drawings.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

DETAILED DESCRIPTION

Figure 1:
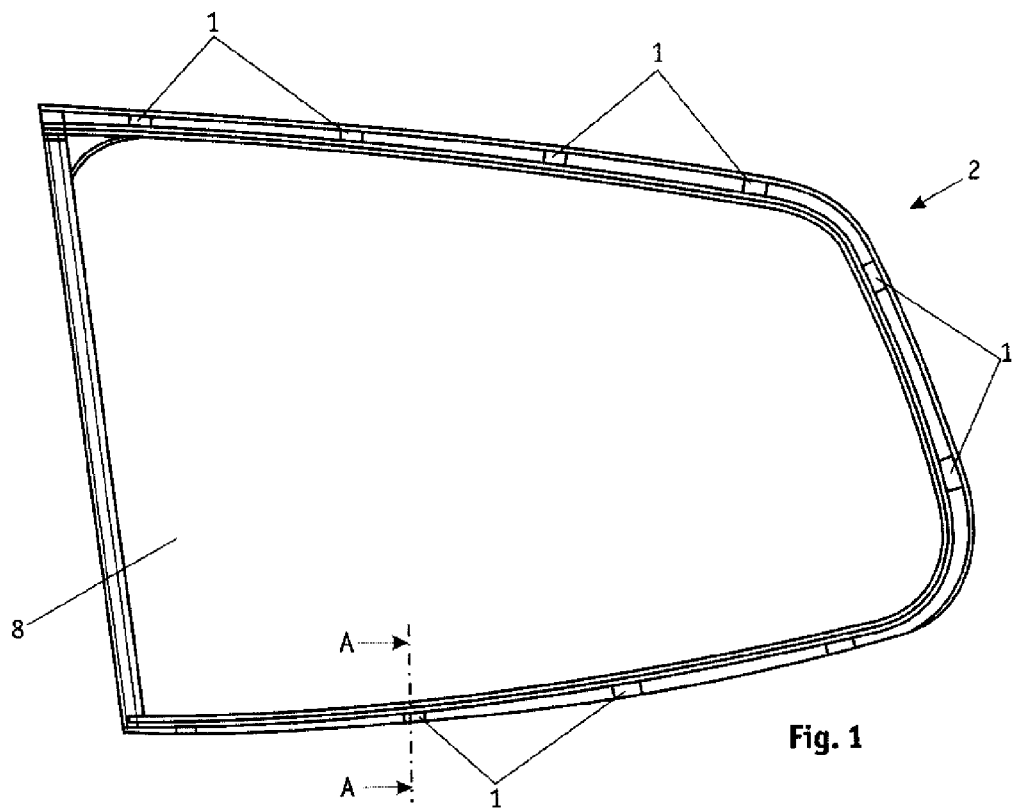
FIG. 1 shows an illustrative side view of a pane assembly comprising sectional line A-A, which is delineated.

For illustration purposes and for further explanation of the invention, FIG. 1 shows a pane assembly 2, here in particular the assembly of a rear side pane, by means of sectional line A-A, which is delineated. The pane assembly 2 encompasses a plurality of clamping holders 1, which are arranged so as to be distributed along the edge of the pane assembly 2

FIGS. 2a, 3a, 4a and 5a each show a possible sectional view according to the sectional line A-A in FIG. 1 according to different embodiment variations of a pane assembly 2 comprising an integrated clamping holder 1. The pane assembly 2 comprises a glass or plastic pane 8, which is connected herein in an exemplary manner to the body panel 10 of a motor vehicle by means of an adhesive beading 9. A frame section 6 of a first plastic material is integrally molded to the pane 8. Attachment part 3, such as a trim, for example, is held by means of a clamping holder 1. Clamping wings 11 of the clamping holder 1 thereby press against retaining webs 12 of the attachment part 3 on the inside and thus lock it to the pane assembly 2. The upper, free end of the attachment part 3 is overlapped by a sealing lip 13, which is embodied on the frame section 6.

In response to the production of the pane assembly 2, the pane 8 is injection molded with the plastic material of the frame section 6. Increasingly, the trend is to use the plastic TPE, instead of PVC for the injection molding of the pane 8. However, a disadvantage of the use of TPE is that, due to the lower modulus of elasticity as compared to PVC, this plastic does not ensure the removal forces for the attachment parts 3, for example trim or the like, which are attached to the frame section 6 or to the clamping holders 1, respectively, which PVC would ensure. For this reason, the aim is to embed the clamping holder 1 for the attachment parts 3 comprising a connecting section 5 into the material of the frame section 6 such that a sufficient clamping force and a sufficient removal reliability is ensured despite the lower modulus of elasticity of the material used for the frame section 6.

At the same time, the aim is to design the production of the pane assembly to be as efficient as possible and to minimize the risk of possible production or quality defects by means of a clever processing from the outset.

As is illustrated in FIGS. 2a to 5c and as is described below, this can be achieved in various ways. Provided that the description does relate exclusively to specific constructive design features of the embodiment variation specifically illustrated in the respective figure, the following description of a certain figure can be transferred to the further figures, even if this is not highlighted separately. The person of skill in the art will recognize, which of the respective described features can be interchanged between the individual embodiments.

Figure 2A:
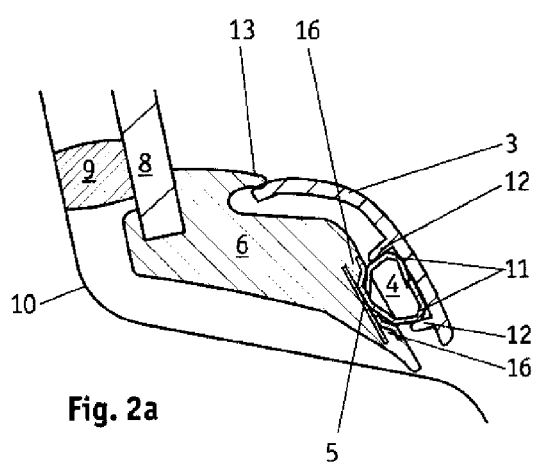
FIG. 2a shows a first possible sectional view according to the sectional line A-A in FIG. 1 according to a first embodiment variation of a pane assembly comprising an integrated clamping holder according to a first embodiment.
Figure 2B:
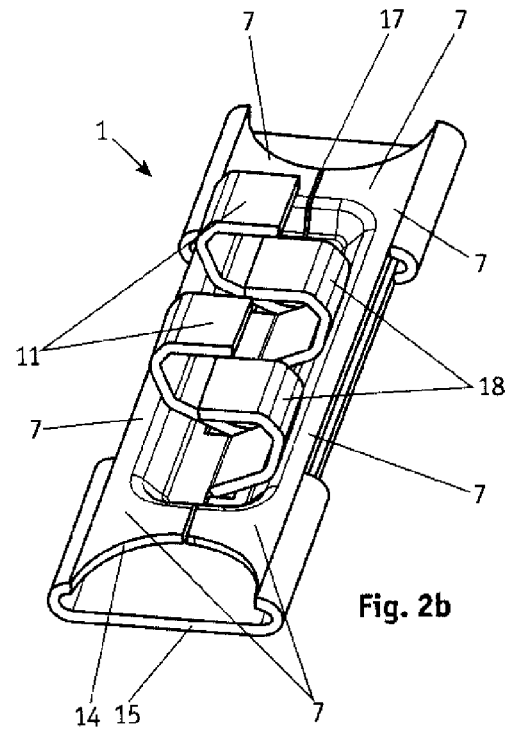
FIG. 2b shows a first embodiment of a clamping holder according to the sectional view shown in FIG. 2a, FIG. 3a shows a second possible sectional view according to the sectional line A-A in FIG. 1 according to a second embodiment variation of a pane assembly comprising an integrated clamping holder according to a second embodiment.

FIGS. 2a and 2b represent a first embodiment variation of the pane assembly 2 or of the clamping holder 1, respectively. The clamping holder 1 is thereby an integral component of the pane assembly 2 and is embodied as a sheet metal. Preferably, stainless steel or steel comprising a corrosion-protective surface coating is used as material. Like the pane 8, the clamping holder 1 is also inserted into an injection mold in response to the production of the pane assembly 2 and is insertion molded in response to the injection for embodying the frame section 6. Through this, clamping holder 1 is embedded into the frame section 6 and is inseparably connected thereto. The positive embedding into the frame section material ensures high removal forces even when preferably selecting TPE as material for the frame section 6, without the danger that damage would be caused to the frame section 6 in response to stress.

As can be seen in FIG. 2b, the clamping holder 1 encompasses a clamp section 4 as well as a connecting section 5. The connecting section 5 is the part of the clamping holder 1, which is embedded in the frame section 6 or which is at least in direct contact therewith. The clamp section 4 is the part of the clamping holder 1, which projects from the frame section of the pane assembly 2 for holding the attachment parts 3.

In the case of the clamping holder 1 shown in FIG. 2b, the connecting section 5 encompasses the characteristic that undercuts 16 are created by embodying the connecting section 5 by means of two sheet metal layers 14 and 15, which are located on top of one another, with the liquid plastic being able to permeate into said undercuts during the injection molding process, so that the clamping holder 1 is embedded in a positive manner in the frame section 6 after the material of the frame section 6 has cooled down.

At the same time, connecting section 5 and clamp section 4 of the clamping holder 1 are designed such that a sealing region or a sealing surface 7, respectively, is embodied on the surface of the connecting section 5, which faces upwards, wherein this sealing region 7 laterally projects beyond the clamp section 5. This makes it possible for the clamping holder 1 to be inserted or clamped into the injection molding tool with the clamping section 5 projecting out of the injection molding tool volume, wherein the circumferential sealing section 7 abuts on the inner wall of the injection molding tool so as to form a seal and prevents that injected plastic can reach the clamp section past the connecting section 5.

For accommodating the clamp section or the clamping wings 11, respectively, the injection molding tool itself encompasses an accommodation, which is preferably dimensioned and adjusted to the clamping holder such that the clamping holder itself can be inserted into the accommodation in a centering manner and that the sealing effect is drawn therein so as to form a support or at least fixedly clamps in the accommodation.

However, it goes without saying that alternative or additional measures can also be taken for attaching the clamping holder or the connecting element, respectively, to the injection molding tool so as to form a seal or to hold it thereon. For example, a vacuum can be generated from the outside within the accommodation after insertion of the clamping holder into the accommodation. In the case of metallic clamping holders, in particular the use of magnetic aids lends itself, thus in particular permanent magnets or electromagnets, which pull the clamping holder tightly towards the inner injection molding tool surface, so that the sealing region of the clamping holder firmly abuts on the injection molding tool.

The clamping holder according to FIG. 2b, together with a first, upper sheet metal layer 14, forms a cavity-like region, which dips inwardly, at the base of which the side of the upper sheet metal layer 14 facing downward and the side of the second lower metal layer 15 facing upwards firmly abut one other circumferentially. This prevents the injected plastic from inadvertently penetrating between the sheet metals layers 14 and 15 during the injection molding process and from penetrating past the bases of the clamping wings 11 to the clamp section 4 of the clamping holder 1. At the joint 17, which runs centrally through the upper sheet metal layer 14 along the clamping holder 1, the respective edges of the sheet metal layer 14 abut one another firmly on the face and relative to the injected plastic so as to form a sufficient seal.

To allow for easy attachment of the attachment parts 3 in the case of which the clamping wings 11 deflect inwardly supported by the attachment motion, the clamping wings 11 encompass attachment bevels 18 in an upper region, which faces outwardly. The clamping wings 11 are preferably embodied such that they extend diagonally upwards and in the direction of the second side of the connecting section 5, starting at a first side of the connecting section 5, so as to then be bent again at a distance to the connecting section 5 towards the first side of the connecting section 5. The last section of a clamping wing 11 extends substantially parallel to the plane formed by the connecting section 5 and serves to support the attachment part 3 and defines the distance thereof to the frame section 6, but is not absolutely necessary in the design as illustrated in the figures. The clamping wings 11 are thereby embodied such that they mutually engage with one another.

Figure 3A:
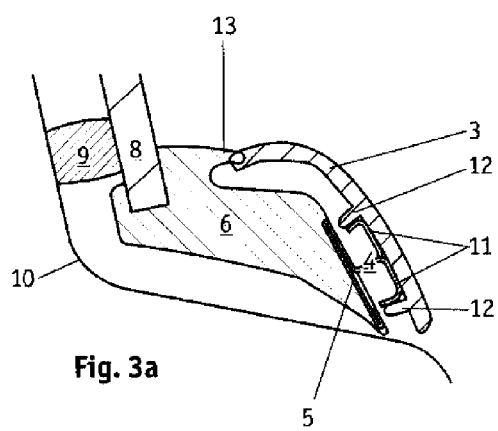
FIG. 3b shows a second embodiment of a clamping holder according to the sectional view shown in FIG. 3a, FIG. 4a shows a third possible sectional view according to the sectional line A-A in FIG. 1 according to a third embodiment variation of a pane assembly comprising an integrated clamping holder according to a third embodiment.
Figure 3B:
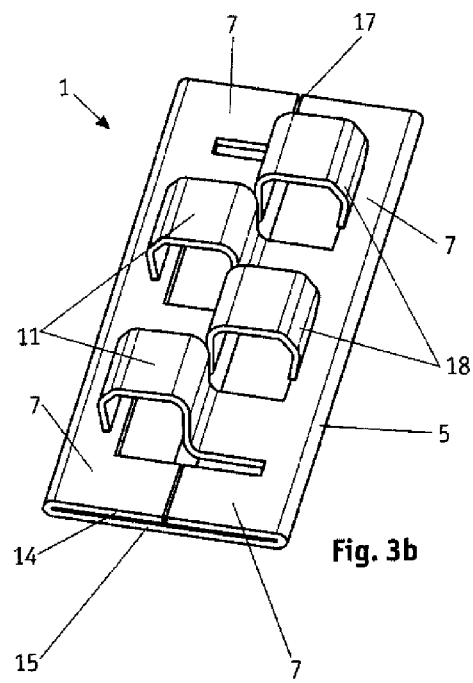

The embodiment variation shown in FIGS. 3a and 3b is also a sheet metal, which encompasses a first upper and a second lower sheet metal layer 14 and 15 in the region of the connecting section 5. As in the case of the embodiment described above with reference to FIGS. 2a and 2b, the clamping holder 1 is inserted or clamped into the tool prior to the injection molding and is subsequently injection molded with the material of the frame section 6.

Due to the absence of the distance between the upper first sheet metal layer 14 and the lower second sheet metal layer 15, no undercuts are embodied in the exemplary embodiment according to FIGS. 3a and 3b, so that the clamping holder 1 is not embedded in the plastic material of the frame section 6 in a positive manner to the same extent as the clamping holder from FIG. 2b. It may therefore be useful to additionally provide at least the surfaces of the connecting section 5, which are in contact with the plastic of the frame section 6, with an adhesion promoter.

It can also be seen at the clamping holder 1 of FIG. 3b that the upper side of the first upper metal layer 14 projects beyond the clamp section 4, thus in particular beyond the clamping wings 11 towards the outside, so as to embody a circumferential sealing region or a circumferential sealing surface 7, respectively, which serves as a seal in the tool. The statements relating to the sealingly abutting surfaces of the two sheet metal layers 14 and 15 already made with reference to FIG. 2b also apply here.

Contrary to the clamping holder from FIG. 2b, free ends of the clamping wings 11 point downwards in the case of the exemplary embodiment in FIG. 3b, wherein provision is made for a attachment bevel 18, which points outwardly, as is the case in the case of the clamping holder according to FIG. 2b in the region of the last bend located upstream of the free end and which supports the deflection of the clamping wings 11 in response to the attachment of the attachment part 3. As is described above, the surface of the clamping wings 11, which points upwards, defines the distance of attachment part 3 and frame section 6.

One advantage of the variation according to FIGS. 3a and 3b compared to the variation shown in FIGS. 2a and 2b is that the clamping holder, in particular the connecting section, is designed so as to be flatter and so that a lower frame section height can be realized.

Figure 4A:
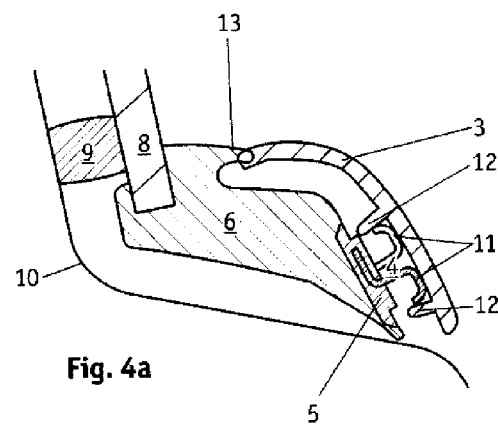
FIG. 4b shows a third embodiment of a clamping holder according to the sectional view shown in FIG. 4a, FIG. 5a shows a fourth possible sectional view according to the sectional line A-A in FIG. 1 according to a fourth embodiment variation of a pane assembly comprising an integrated clamping holder according to a fourth embodiment.
Figure 4B:
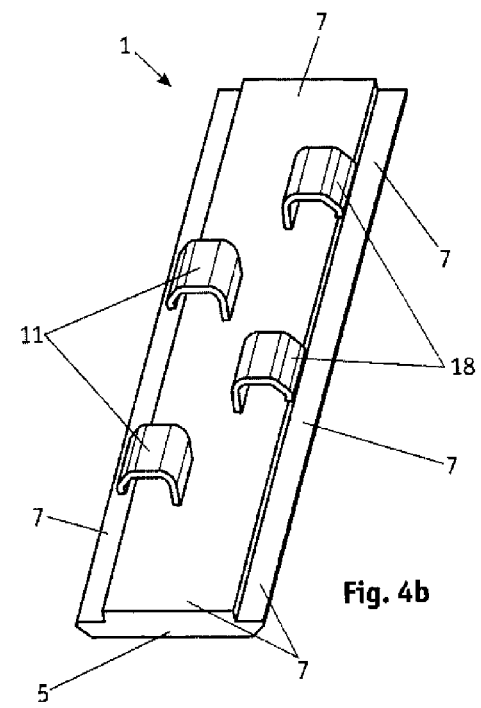

FIGS. 4a and 4b show a further embodiment variation of a clamping holder 1. The orientation and arrangement of the clamping wings 11 of the clamp section 4 thereof is similar to that of the clamping holder from FIG. 3b. The clamp section 4 is made as a sheet metal part and the connecting section 5 is made of plastic as an injection molded part. In the case of the production of the clamping holder 1 according to FIG. 3b, the metal clamp forming the clamp section 4 is injection molded with the plastic of the connecting section 5 and is embedded therein in a positive manner. The plastic used to produce the connecting section 5 is thereby preferably a plastic, which encompasses a higher modulus of elasticity than that of the frame section 6 of the pane assembly 2 and which bonds well to the plastic of the frame section 6 in response to the injection molding of the clamping holder 1, thus in particular with TPE, so as to ensure high removal forces. Preferably, a thermoplastic plastic is used. The additional use of an adhesion promoter may also lend itself.

As is also the case in the case of the above-described clamping holders, the upper surface of the connecting section 5 projects laterally relative to the clamping wings 11 while forming a sealing region or a sealing surface 7, respectively, so that a reliable sealing of the clamp section 4 in the injection molding tool is ensured in response to the injection molding of the pane 8 and of the clamping holder 1 with the plastic of the frame section 6.

Even though all of the afore-described clamping holders are not necessarily made in a single piece of material, thus in one piece and from one material, as in the case of the clamping holders illustrated in FIGS. 2b and 3b, but they are at least embodied as a one-piece component comprising components, which are connected to one another so as not to be capable of being detached.

Figure 5A:
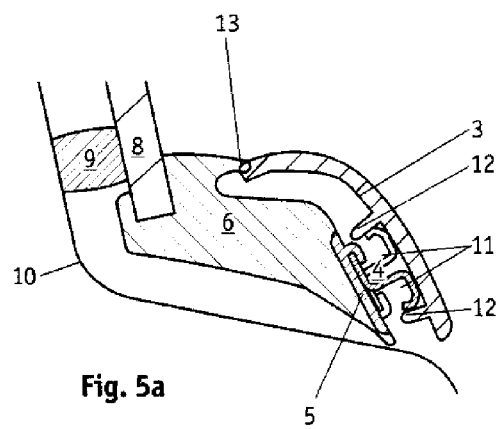
FIG. 5b shows a fourth, two-piece embodiment of a clamping holder according to the sectional view shown in FIG. 4a, and FIG. 5c shows the clamping holder from FIG. 5b prior to the joining of connecting part and clamp part.
Figure 5B:
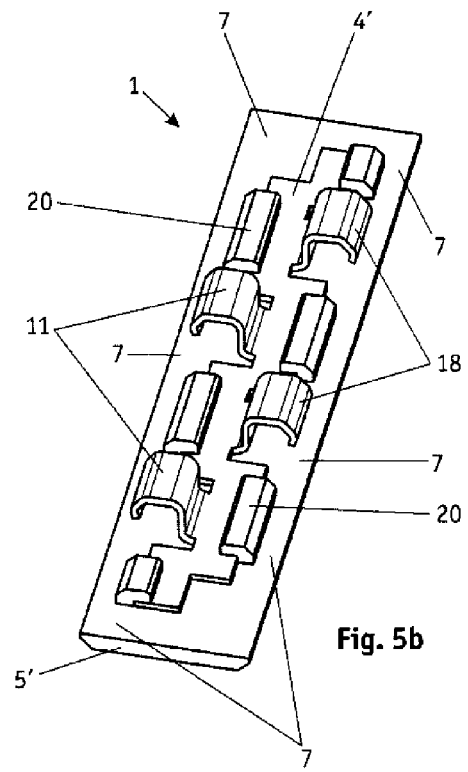
Figure 5C:
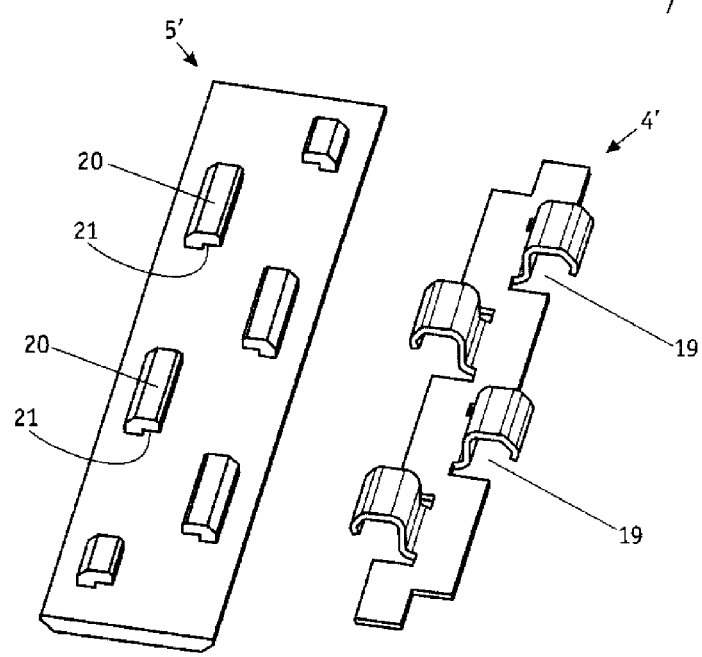

FIGS. 5a, 5b and 5c show a fourth embodiment variation of a pane assembly 2 and of a clamping holder 1. The clamp section 4 of a clamp part 4', which is present as a separate component in the form of a metal clamp, and the connecting section 5 of a connecting part 5', which is present as a separate component in the form of a connecting plate-shaped injection molded part is preferably formed from thermoplastic plastic. The clamp part 4' with its clamping wings 11, however, is not embedded in the connecting part 5' so as not to be capable of being detached, but is attached to the connecting part 5' via a detachable plug-in or snap-in connection.

In particular, such a detachable connection also has the advantage that the clamp part 4' must not necessarily be arranged on the connecting part 5' and thereby on the frame section 6 of the pane assembly 2 in the case of certain applications but can also be arranged on the attachment part 3 itself. This lends itself in particular in the case of attachment parts, which run in rectilinear direction. In addition, a detachable connection of clamp section and connecting section makes it possible to use different clamp variations, for example for different attachment parts or for similar attachment parts from different manufacturers, despite the use of the same connecting section. The usability of the connecting section is thus more universal.

The clamping holder 1 shown in FIGS. 5*a,* 5*b* and 5*c* is embodied such that the recesses 19 on the clamp part 4', which are created below the clamping wings 11 by the angled sections thereof, can be brought into congruence with the holding projections 20 of the connecting part 5', so that the bottom of the clamp part 4' is supported on the upper side of the connecting part 5'. The clamp part 4' can then be slid sideways underneath the clamping grooves 21, which are embodied by means of the holding projections 20, so that the holding projections 20 overlap the clamp part 4'. The holding projections 20 located opposite one another with the clamping grooves 21 located therein are thereby preferably oriented so as to face one another, so that the clamp part 4' is located between the holding projections 20 with the longitudinal edges facing outwardly and is overlapped by the holding projections 20 or by the clamping grooves 21, respectively, from the outside. Only this measure makes it possible at all to embody the connecting part 5' such that a sealing region 7, which revolves on the outside on the connecting part 5', can be embodied on the connecting part 5'.

As is the case in all of the clamping holders illustrated in the figures, a sealing region or a sealing surface 7, respectively, is also embodied on the clamping holder 1 illustrated in FIGS. 5*a,* 5*b* and 5*c* in that the connecting part 5' laterally projects beyond the clamping wings 11 of the clamp part 4', with said sealing region or sealing surface being capable of keeping the clamp section 4 or the clamp part 4', respectively, thus in particular the clamping wings 11, free from injected plastic in response to the injection molding process.

As far as the afore-described clamping holders always referred to a clamp section or a clamp part made of metal, respectively, the person of skill in the art will easily recognize that clamp sections made of other materials, in particular also of plastics, are also possible, depending on the stress, which is to be expected, and depending on the removal force, which is to be ensured.

The clamp sections illustrated in the figures in each case encompass four clamping wings, which are oriented in opposite direction in an alternating manner. It goes without saying that the invention is not limited to such an embodiment, neither with reference to the number nor with reference to the orientation or design of the individual clamping wings.

The invention claimed is:

1. A window pane assembly for covering an opening of a vehicle and receiving an attachment part, the assembly comprising:
   a pane;
   an injection molded frame section with the pane embedded therein;
   a clamping holder having:
      a connecting section embedded in the injection molded frame section for attaching the damping holder to the injection molded frame section, the connecting section defining a sealing region which provides to sealing interface with an injection molding tool;
      a clamp section projecting out of the injection molded frame section for attachment to the attachment part, the clamp section having clamping wings projected outwardly wherein the attachment part engages outer sides of the outwardly projecting clamping wings for securing the attachment part to the window pane assembly;
   wherein the connecting section projects laterally outward beyond the clamping wings of the clamp section on opposed sides of the clamping wings and is vertically gapped from outermost portions of the damping wings of the clamp section forming the sealing region circumscribing the clamping wings of the clamp section so that the connecting section and the damping wings of the clamp section are insertable together into the injection molding tool with the injecting region of the connecting section abutting and forming a seal with the injection molding tool to prevent injected plastic from reaching the clomping wings of the clamp section;
   wherein the attachment part is a trim member.

2. The assembly of claim 1, wherein the clamp section is formed by a clamp part, which is held on a connecting part, which forms the connecting section so as to be capable of being detached.

3. The assembly of claim 1, wherein that the clamp section is formed by a clamp part, which is injection molded in a positive manner by a connecting part, which embodies the connecting section.

4. The assembly of claim 1, characterized in that the connecting section and the clamp section are embodied from a one-piece sheet metal.

5. The assembly of claim 1, wherein the connecting section is provided with an adhesion promoter.

* * * * *